United States Patent Office 3,574,853
Patented Apr. 13, 1971

3,574,853
COMPOSITION AND METHOD OF REDUCING SERUM CHOLESTEROL WITH THIOBISCRESOLS
James W. Barnhart, Indianapolis, Ind., assignor to The Dow Chemical Company, Midland, Mich.
No Drawing. Filed May 11, 1967, Ser. No. 637,633
Int. Cl. A61k 27/00
U.S. Cl. 424—337
10 Claims

ABSTRACT OF THE DISCLOSURE

Methods useful for lowering serum cholesterol in animals comprising administration to the animal of a hypocholesteremic amount of a thiobis(butylcresol) compound such as α,α'-thiobis(2,6-di-tert-butyl-p-cresol), and compositions to be employed in practicing the method.

---

This invention relates to novel compositions and methods for using the same for reducing the concentration of cholesterol in the blood of animals. More particularly, the invention is directed to novel compositions and methods for using the same to reduce cholesterol levels in the blood of mammals wherein the compositions contain a hypocholesteremic amount of a thiobis(butylcresol) compound.

It is an object of this invention to provide novel compositions which have the effect of lowering blood cholesterol upon the administration of such compositions to animals. A further object of this invention is to provide novel compositions which have the effect of lowering blood cholesterol in warm-blooded animals and which have low toxicity and little or no pharmacological effects in other areas at dosage levels consistent with good hypocholesteremic or cholesterol-lowering activity. It is a further object of this invention to provide novel compositions which have the effect of lowering blood cholesterol in animals and which exert little or no estrogenic effect at dosage levels consistent with good hypochloesteremic activity. A further object of the invention is to provide a method and compositions useful for alleviating hypercholesteremia in mammals.

It has been found that the serum cholesterol level of warm-blooded animals may be lowered by administering to the animal a hypocholesteremic amount of a thiobis(butylcresol) compound corresponding to the formula

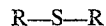         I wherein R is a butylcresol radical corresponding to one of the formulae

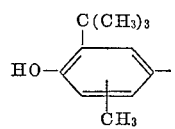         II

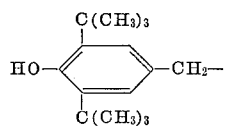         III or of a suitable composition or dosage form containing as the active ingredient thereof a hypocholesteremic amount of at least one such compound. The compounds are crystalline solids which are soluble in a variety of organic solvents such as alcohol, acetone and benzene and only slightly soluble in water. They can be prepared by known methods for the preparation of thiobiscresols.

For the sake of convenience, compounds having the above-described chemical structures will be referred to hereinafter as thiobiscresols.

It has been found that the thiobiscresols, when administered to animals and in particular to mammals in accordance with the method of the invention, have the effect of lowering the serum cholesterol content, that is, the amount of cholesterol in the blood serum of the animal to which is administered an active compound of the invention. Thus, the method and compositions of the invention are useful for alleviation of hypercholesteremia in mammals. The thiobiscresols are preferably administered internally as compositions in dosage unit form. Such compositions can be prepared by known techniques, for example, tableting or encapsulation. The dosage units preferably contain from about 100 milligrams to about 5 grams of the active ingredient. The compounds can also be administered as nutritive compositions adapted to be fed as part or all of the animal diet.

In forming the compositions of the invention, the active thiobiscresols are incorporated in a non-toxic carrier. In the present specification and claims, the term "non-toxic carrier" refers to conventional excipients and includes nutritive compositions such as a solid or liquid foodstuff. In the present specification and claims, "excipient" refers to known pharmaceutical or veterinary excipients which are substantially non-toxic and non-sensitizing at dosages consistent with good hypocholesteremic activity.

Suitable solid non-toxic carriers which can be employed for formulating compositions of the invention in tablet form can include, for example, solid inert diluents such as calcium carbonate, sodium carbonate, lactose, glucose, calcium phosphate or sodium phosphate; granulating and disintegrating agents such as corn starch or alignic acid; binding agents such as starch, gelatin or gum acacia; and lubricating agents such as magnesium stearate, stearic acid or talc. The tablets may be uncoated or they may be coated by known techniques to delay disintegration or absorption in the gastrointestinal tract and thereby provide sustained action over a prolonged period. Tablets for maintaining prolonged effects can contain the active ingredient embedded in a waxy core around which is compressed a granulated mixture of the active compound together with a non-toxic carrier.

Other formulations for oral use can also be prepared as hard or soft gelatin capsules wherein the thiobiscresol is mixed with an inert solid diluent such as calcium carbonate, calcium phosphate or kaolin or an inert oily medium such as olive oil or liquid paraffin. The mixtures can then be filled into gelatin capsules by conventional procedures.

Liquid compositions can also be formulated by dissolving or suspending the active thiobiscresol in nontoxic liquid carriers, for example, a vegetable oil such as olive oil, peanut oil or cocoanut oil, a mineral oil, glucose syrup, syrup of acacia, ethanol, polyethylene glycols, glycerine, water, saline and the like, and the said compositions can contain a thickening agent such as beeswax or cetyl alcohol. The liquid compositions can be administered orally as syrups, elixirs or the like. They can also be formulated as sterile injectable compositions.

Aqueous suspensions can contain the active thiobiscresols in admixture with suspending agents, dispersing agents, wetting agents and the like known to be suitable in the manufacture of aqueous suspensions. Suitable nontoxic carriers can be, for example, suspending agents such as methyl cellulose, hydroxypropylmethyl cellulose, sodium alginate, gum tragacanth or gum acacia and the like, and compatible mixtures thereof. Dispersing or wetting agents can include lecithin, polyoxyethylene stearate, condensation products of ethylene oxide with aliphatic alcohols, condensation products of ethylene oxide with esters derived from fatty acids and hexitol anhydrides such as polyoxyethylene sorbitan monooleate or the like excipients. Dispersible powders and granules suitable for preparation of an aqueous suspension by the addition of water contain the thiobiscresol in admixture with a dispersing or wetting agent, suspending agent or the like.

The compositions of the invention can also be in the form of water-in-oil or oil-in-water emulsions. Such emulsions can include such non-toxic carriers as corn oil, olive oil, arachis oils, emulsifying agents such as gum acacia, gum tragacanth, lecithin, sorbitan monooleate and the like, and compatible mixtures thereof.

The compositions described above can also contain, in addition, sweetening agents such as sugar, saccharin or sodium cyclamate, flavoring agents such as caramel, preservatives such as ethyl p-hydroxybenzoate, antioxidants such as ascorbic acid and suitable coloring materials. The compositions generally contain from about 2 to about 95 percent, and preferably from about 45 to 95 percent of the active thiobiscresol. The solid compositions such as tablets and capsules contain from about 45 to about 95 percent of the active compound. The liquid compositions contain from about 2 to 50 percent, and preferably from about 20 to 60 percent of the thiobiscresol.

The active thiobiscresols can also be incorporated in a foodstuff such as, for example, butter, margarine, edible oils and the like. The active compounds can also be prepared in the form of a nutritive composition in which the active ingredient is mixed with vitamins, fats, proteins or carbohydrates and the like, or mixtures thereof. The nutritive compositions are adapted to be administered as the total diet, as a part of the diet or as a supplement to the diet. The active thiobiscresol compounds can also be formulated as concentrated compositions which are adapted to be diluted by admixture with liquid or solid foodstuffs. The concentrated compositions are prepared by mechanically milling or otherwise mixing the active compound with an inert carrier such as silica gel, soluble casein, starch or the like, or mixtures thereof. The concentrated compositions can also include additional ingredients such as vitamins, minerals, proteins and the like.

The hypocholesteremic amount of the thiobiscresol compounds to be administered to an animal, that is, the amount which is effective to significantly lower the serum cholesterol level, can vary depending upon such factors as the size, weight and age of the animal treated, the particular compound employed, the desired serum cholesterol level to be obtained, whether or not the animal is hypercholesteremic, the period of administration and the method of administration. In general, the thiobiscresols are administered in daily dosages of between about 10 milligrams and about 5 grams of the active ingredient per kilogram of body weight of the animal to be treated. A daily dosage of between about 25 and about 1000 milligrams of active compound per kilogram of animal body weight is preferred.

The following examples illustrate the present invention but are not to be construed as limiting.

EXAMPLE 1

One part of 4,4'-thiobis(6-tert-butyl-m-cresol) was dissolved in 4 parts of acetone and the solution mixed with 3 parts of silica gel to absorb the 4,4'-thiobis(6-tert-butyl-m-cresol) on the silica gel. The mixture was dried to obtain a concentrated composition containing 25 percent of the active ingredient.

In substantially the same procedure, one part of 4,4'-thiobis(6-tert-butyl-o-cresol) was adsorbed on 3 parts of silica gel and dried to obtain a concentrated composition.

In substantially the same procedure, a concentrated composition was obtained by mixing together one part of α,α'-thiobis(2,6-di-tert-butyl-p-cresol), 4 parts of acetone and 3 parts of silica gel and removing the acetone by drying.

EXAMPLE 2

Each of the concentrated compositions of Example 1 was employed to prepare separate nutritive compositions by intimately mixing 0.5 part of a concentrated composition of Example 1 with 99.5 parts of standard animal feed on a conventional roller mill. There were thus obtained separate nutritive compositions suitable for oral administration to animals for the purpose of lowering serum cholesterol levels. The compositions were adapted to be fed as the entire animal diet.

EXAMPLE 3

A feed composition consisting of balanced rodent feed was mixed together with various amounts of a thiobiscresol compound to prepare a series of separate nutritive compositions each containing 0.125 percent of one of the thiobiscresol compounds. Separate groups of six male mice were fed for two weeks on separate diets consisting of one of the above-described compositions. For purposes of comparison, other groups of mice were similarly fed on diets containing 0.125 percent of a known thiobisalkylphenol compound. Separate groups of mice were fed for two weeks on a similar diet which contained no thiobiscresol to serve as a check. At the end of the two week period, the mice were exsanguinated under ether anesthesia. Serum cholesterol was determined by taking a 0.05 milliliter aliquot of serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check groups of mice was used as the basis for calculating percentage reduction of cholesterol. The percentage reduction of cholesterol for the particular compounds employed is set out in the following table.

Table I

| Compound: | Percent reduction in serum cholesterol |
| --- | --- |
| 4,4'-thiobis(6-tert-butyl-m-cresol) | 31 |
| 4,4'-thiobis(6-tert-butyl-o-cresol) | 23 |
| α,α'-Thiobis(2,6-di-tert-butyl-p-cresol) | 29 |
| 4,4'-thiobis(2,6-di-tert-butylphenol) | 0 |
| 2,2'-dithiobis(6-tert-butyl-p-cresol) | 0 |
| 2,2'-thiobis(6-tert-butyl-p-cresol) | 0 |

EXAMPLE 4

Groups of mice were administered α,α'-thiobis(2,6-di-tert-butyl-p-cresol), a representative thiobis-cresol, by intraperitoneal injection of an aqueous methyl cellulose suspension of the thiobiscresol at a dosage rate of 500 milligrams per kilogram. No significant effects were observed in standard pharmacological tests to determine analgesic effect, transquilizing effect and hypnosedative effects.

In other operations, mice were administered one of the active compounds and examined periodically for toxic symptoms. The mice were examined for performance on a vertical stationary bar and on a slowly turning horizontal bar. Corneal, pinnal and tail pinch reflexes were observed for abnormal responses. In such operations, groups of ten mice were administered α,α'-thiobis(2,6-di-tert-butyl-p-cresol) orally at dosage levels of 0.46, 1.0 and 4.6 grams per kilogram in an aqueous methyl cellulose suspension. The mice were held and observed for symptoms of toxicity for one week after administration of the above-named compound. No symptoms of toxicity were observed in any of the mice at any dosage level and after one week, all the mice appeared normal and healthy.

In similar operations, a group of four mice was administered an aqueous methyl cellulose suspension of α,α'-thiobis(2,6-di-tert-butyl-p-cresol) in an amount sufficient to provide a dosage rate of 0.4 gram per kilogram by intraperitoneal injection. The mice were held and examined dialy for five days after administration of the above-named compound for symptoms of toxicity. No symptoms of toxicity were observed and at the end of the five day period, the mice appeared healthy and normal.

EXAMPLE 5

Fifty parts of α,α'-thiobis(2,6-di-tert-butyl-p-cresol) are intimately mixed with 2 parts of ascorbic acid and 48 parts of corn starch on conventional mixing apparatus. The mixture is then filled into gelatin capsules in the amount of 1 gram per capsule to provide a dosage form suitable for administration to animals.

95 parts of 4,4'-thiobis(6-tert-butyl-m-cresol), 0.75 part of pyridoxine hydrochloride, 19.25 parts of ascorbic acid and 85 parts of 4,4'-thiobis(6-tert-butyl-o-cresol) are intimately mixed together. The mixture is then mixed well with 75 parts of milk sugar and 125 parts of corn starch and filled into gelatin capsules in the amount of 1.5 grams per capsule to provide a dosage form suitable for oral administration to animals.

EXAMPLE 6

25 milliliters of ethanol are diluted with 75 milliliters of polyethylene glycol-200 to make a total of 100 milliliters of liquid. Two grams of α,α'-thiobis(2,6-di-tert-butyl-p-cresol) are dissolved in the ethanol-polyethylene glycol-200 mixture and the solution is sterilized. There is thus obtained a composition suitable for injection for the purpose of lowering abnormally high serum cholesterol levels. Injection of 5 milliliters of the composition supplies 200 milligrams of the active ingredient.

EXAMPLE 7

A mixture consisting of 250 parts of α,α'-thiobis(2,6-di-tert-butyl-p-cresol) and 8 parts of wheat starch is mixed with a paste composed of 40 parts of wheat starch and 6 parts of gelatin in 75 parts of water. The mixture is granulated, passed through an 8 mesh screen and dried. The granulate is then passed through a 12 mesh screen and mixed well with 13 parts of talc and 4 parts of magnesium stearate. The resulting mixture is compressed into tablets weighing 6 grams each. The tablets are scored by known methods and are adapted to be administered orally as a single dosage or as multiple dosages, each comprising one-half or one-fourth of a single tablet.

What is claimed is:

1. A method for lowering serum cholesterol in animals comprising administering orally to an animal a compound selected from the group consisting of 4,4'-thiobis(6-tert-butyl-m-cresol), 4,4'-thiobis(6 - tert-butyl-o-cresol) and α,α'-thiobis(2,6 - di-tert-butyl-p-cresol) in a daily dosage of from about 10 milligrams to about 5 grams of compound per kilogram of animal body weight.

2. The method of claim 1 which comprises administering orally to the animal a daily dosage of between about 25 milligrams and about 1000 milligrams of the compound per kilogram of animal body weight.

3. The method of claim 1 wherein the compound is α,α'-thiobis(2,6-di-tert-butyl-p-cresol).

4. The method of claim 1 wherein the compound is 4,4'-thiobis(6-tert-butyl-m-cresol).

5. A method for lowering serum cholesterol levels in animals comprising administering orally to an animal having a high serum cholesterol level an amount of a thiobiscresol compound effective to lower the serum cholesterol level in said animal, said thiobiscresol compound being a compound selected from the group consisting of 4,4' - thiobis(6 - tert-butyl-m-cresol), 4,4' - thiobis(6-tert-butyl-o-cresol) and α,α'-thiobis(2,6 - di-tert-butyl-p-cresol).

6. The method of claim 5 wherein the compound is α,α'-thiobis(2,6-di-tert-butyl-p-cresol).

7. The method of claim 5 wherein the compound is 4,4'-thiobis(6-tert-butyl-m-cresol).

8. The method of claim 5 wherein the compound is 4,4'-thiobis(6-tert-butyl-o-cresol).

9. A composition in dosage unit form adapted for oral administration to animals consisting essentially of in each dosage unit a pharmaceutical excipient and from about 100 milligrams to about 5 grams per unit of a compound selected from the group consisting of 4,4'-thiobis(6-tert-butyl-m-cresol), 4,4' - thiobis(6 - tert-butyl-o-cresol), and α,α'-thiobis(2,6 - di-tert-butyl-p-cresol), said composition containing from about 2 to about 95 percent of said compound.

10. The composition of claim 9 wherein the compound is α,α'-thiobis(2,6-di-tert-butyl-p-cresol).

References Cited

UNITED STATES PATENTS

| 2,364,338 | 12/1944 | Beaver | 260—609X |
| 2,841,619 | 7/1958 | Albert | 260—609 |
| 3,065,275 | 11/1962 | Goddard | 260—609 |
| 3,279,922 | 10/1966 | Jaworski | 99—8X |

FOREIGN PATENTS

| 201,160 | 1/1956 | Australia | 260—609 |
| 1,088,455 | 10/1967 | Great Britain. | |

OTHER REFERENCES

Bickoff et al.: J. Am. Oil Chem. Soc. vol. 32, pp. 64–68, 1955.

STANLEY J. FRIEDMAN, Primary Examiner

L. SCHENKMAN, Assistant Examiner

U.S. Cl. X.R.

424—346